2,947,771
Patented Aug. 2, 1960

2,947,771

AMINOALKYLPOLYSILOXANES AND PROCESS FOR THEIR PRODUCTION

Donald L. Bailey, Snyder, N.Y., assignor to Union Carbide Corporation, a corporation of New York No Drawing. Filed Oct. 12, 1956, Ser. No. 615,507

9 Claims. (Cl. 260—448.2)

This invention relates in general to the synthesis of organopolysiloxanes. More particularly, this invention is concerned with the production of end-blocked organopolysiloxanes containing, among other siloxane units, aminoalkylalkylsiloxane or aminoalkylarylsiloxane units in which the amino group is linked to the silicon atom thereof through a polymethylene chain of at least three carbon atoms, and to such end-blocked polysiloxanes as new compositions of matter.

The present invention is based in part upon our discovery that essentially linear organopolysiloxanes containing one or more dimethylsiloxane, diphenylsiloxane, or methylphenylsiloxane units as well as one or more aminoalkylalkylsiloxane or aminoalkylarylsiloxane units can be produced by heating a mixture of (1) either cyclic dimethylsiloxanes, cyclic diphenylsiloxanes or cyclic methylphenylsiloxanes as well as relatively low molecular weight trimethyl end-blocked dimethylpolysiloxanes or relatively low molecular weight alkoxy-containing or alkoxy end-blocked dimethylpolysiloxanes or mixtures thereof with (2) either cyclic aminoalkylalkylsiloxanes, cyclic aminoalkylarylsiloxanes, or the hydrolyzates of aminoalkylalkyldialkoxysilanes and of aminoalkylaryldialkoxysilanes as well as aminoalkyldialkoxydisiloxanes, aminoalkyldialkoxysilanes, and aminoalkyldialkylalkoxysilanes.

The linear organopolysiloxanes of the instant invention are end-blocked polymers which can be graphically represented by the structural formula, having the units:

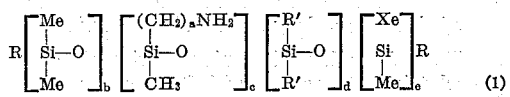   (1)

wherein R represents either a methyl group or an alkoxy group, such as ethoxy or propoxy and the like, R' represents either a methyl or a phenyl group, (a) is a number having a value of at least 3, (b) and (e) are numbers having an average value of from 0 to 2, (c) is a number having an average value of from 1 to 30 and (d) is a number having an average value of from about 5 to about 400.

As depicted by the above formula, our organopolysiloxanes are end-blocked with various organic groups and the nature of such groups determines to an extent, as well as the degree of, the reactivity thereof. By way of illustration, when the organopolysiloxanes of our invention contain only methyl groups, or only phenyl groups, as the end-blocking groups, further reaction of such polymers through the terminal ends thereof is unlikely. On the other hand when such organopolysiloxanes contain one or more alkoxy groups or one or more aminoalkyl groups, further reaction of such polymers through the terminal ends thereof is possible.

Our end-blocked organopolysiloxanes can be more specifically depicted by the formula:

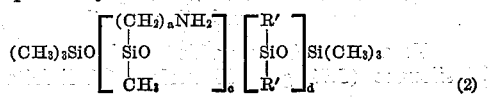   (2)

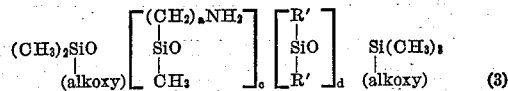   (3)

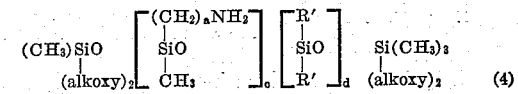   (4)

as well as organopolysiloxanes having structures similar to those depicted in the above formulae in which:

(I) One of the terminal methyl groups at one or both ends of the polymer chains is replaced by an aminoalkyl group, (II) One of the terminal alkoxy groups at one or both ends of the polymer chains is replaced by an aminoalkyl group, (III) All of the terminal groups of the polymer chains are alkoxy groups, and (IV) One or two of the terminal groups at one or both ends of the polymer chains are phenyl groups (i.e., in Formula 1 (b) and (e) are equal to 0 and (d) has a value of at least 2).

The aminoalkyl silicon compounds which we can employ as one of the starting materials in preparing the organopolysiloxanes of the present invention include those compounds which are either (1) linear or cyclic aminoalkylmethylpolysiloxanes, (2) aminoalkylmethylalkoxysilanes, or (3) aminoalkylalkoxysilanes and aminoalkylalkoxypolysiloxanes. Typical of the aminoalkylmethylpolysiloxanes suitable for use in our process are those polymers containing the unit:

   (5)

wherein (a) has the value defined above, (n) has a value of at least 2 and can be as high as 100 to 1000 and more. Such polysiloxanes can be cyclic polymers wherein (n) has a value of from 3 to 7 or they can be hydroxy or alkoxy end-blocked aminoalkylmethylpolysiloxanes as well as a hydrolyzate of an aminoalkylmethyldialkoxysilane. The bis(aminoalkyldialkoxy) disiloxanes can also be employed as one of our starting materials.

Illustrative of such aminoalkylmethylpolysiloxanes are the cyclic trimers, tetramers, pentamers of gamma-aminopropylmethylsiloxane, delta-aminobutylmethylsiloxane, epsilon-aminopentylmethylsiloxane, and the like, as well as the hydrolyzates of gamma-aminopropylmethyldialkoxysilanes with the aminopropylalkoxypolysiloxanes and the aminobutylalkoxypolysiloxanes.

Aminoalkylpolysiloxanes of the above type are disclosed and claimed in U.S. applications Serial Nos. 615,481 and 615,483, filed concurrently herewith, both abandoned. Processes for preparing the same aminoalkylpolysiloxanes are also disclosed and claimed in said copending applications.

Illustrative of the aminoalkylmethylalkoxysilanes suitable for use in our process are those compounds represented by the formula:

$$H_2N(CH_2)_aSiR_3 \qquad (6)$$

wherein (a) has the value defined above, R is either a methyl group or an alkoxy group and at least one of the groups represented by R is an alkoxy group. Typical of such compounds are gamma-aminopropyltriethoxysilane, delta-aminobutyltriethoxysilane, gamma-aminopropylmethyldiethoxysilane, delta-aminobutylmethyldiethoxysilane, gamma-aminopropyldimethylethoxysilane, delta-aminobutyldimethylethoxysilane, epsilon-aminopentylmethyldiethoxysilane and the like. Such aminoalkylmethylalkoxysilanes are disclosed and claimed in copending U.S. application Serial No. 483,421, filed January 21, 1955, now U.S. Patent No. 2,832,754, and U.S. application Serial No. 615,466, filed concurrently herewith, now U.S. Patent No. 2,930,809. Also disclosed and claimed herewith are processes for their production.

The methyl- and phenyl-silicon compounds which I can employ as one of my starting materials are the cyclic dimethylsiloxanes, the cyclic diphenylsiloxanes and the cyclic methylphenylsiloxanes, as well as the relatively low molecular weight trimethylsiloxy end-blocked dimethylpolysiloxanes which include octamethyltrisiloxane, decamethyltetrasiloxane and the like, and the relatively low molecular weight alkoxy-containing or alkoxy end-blocked dimethylpolysiloxanes such as bis(dimethylethoxysiloxy) dimethylsilane, bis(methyldiethoxy)tetramethyldisiloxane, bis(trimethylsiloxy)ethoxytrimethyldisiloxane and the like.

In carrying out my reaction, I form a mixture of one or more of each of my starting materials together with an alkali metal catalyst and heating the mixture to a temperature sufficiently elevated to cause equilibration of the starting materials (a redistribution of the siloxane units). There results, or is produced an organopolysiloxane depicted by the above generic Formula 1.

The temperatures to which my reaction mixture is heated are not narrowly critical and can vary over a wide range. I can employ temperatures of from about 120° C. (and lower) up to temperatures of about 200° C. and higher. Preferably we employ temperatures in the range of from about 130° C. to about 180° C.

As catalysts for the reaction, I prefer to employ the alkali metals, such as sodium and potassium. The metals can be added in various forms as for example sodium or potassium hydroxide or as the silanolate derivatives thereof.

In the practice of my process, when I employ only cyclic siloxanes as the starting materials, we prefer to add to such mixtures small amounts of compounds known as chain end-blocking compounds as for example monomeric alkoxy-containing compounds or low-molecular weight trimethylsiloxy end-blocked dimethylsiloxanes or other alkoxy-containing compounds. Compounds of this type suitable for use in my process have been described in detail above.

My end-blocked organopolysiloxanes of the instant invention contain from as little as 1 to as much as 30 aminoalkylmethylsiloxane units per molecule and can contain from as little as 5, and preferably as little as 7, dimethylsiloxane, diphenylsiloxane or methylphenylsiloxane units to the molecule. Such organopolysiloxanes vary in molecular weight from about 1000 to as much as about 30–35,000 and contain aminoalkylmethylsiloxane units in an amount by weight of from about slightly less than 1 percent to as much as about 50 percent.

The organopolysiloxanes of the present invention can be employed as intermediates in the preparation of modified polysiloxanes of the thermosetting type. By way of illustration, they can be co-equilibrated with partially condensed methylpolysiloxanes to form coating materials. In addition, they can be employed as sizes for fibrous materials particularly fibrous glass materials employed in combination with thermosetting resins, as for example, the aldehyde-condensation resins, the epoxy resins, the urethane resins and the polyamide resins. My organopolysiloxanes can also be employed as water repellents for such materials as wool, cotton and viscose-acetate fibers.

The end-blocked organopolysiloxane oils of my invention find particular use in the electrical field where they can be employed as capacitors, dampening fluids and the like where a relatively high dielectric constant, a low power factor and a relatively high resistivity are desired for silicone oils. The oils of our invention have dielectric constants (1000 cycles) in the range of 2.1–2.3 up to 3.88–4.00, power factors of from 0.001 to 0.0002 and resistivities (ohm-cm.) of from $1.3 \times 10^{13}$ up to $6.0 \times 10^{14}$. I have found that when end-blocked organopolysiloxanes containing aminoalkylmethylsiloxane groups in an amount of more than about 50 percent by weight they do not have the desirable electrical properties set forth above.

The following examples are illustrative of the invention.

EXAMPLE I

*A trimethylsiloxy end-blocked gamma-aminopropylmethylsiloxane-modified dimethylpolysiloxane oil having a molecular weight of about 5000 and containing an average of about 2 gamma-aminopropylmethylsiloxane units per molecule (containing about 25% by weight of gamma-aminopropylmethylsiloxane units)*

To a 500-ml. flask equipped with air condenser and mechanical stirrer was added the cyclic tetramer of dimethylsiloxane (101 g., 1.36 moles of siloxy unit), dodecamethylpentasiloxane (11.5 g., 0.030 mole) and a mixture of cyclic gamma-aminopropylmethylsiloxanes (37.5 g., 0.032 mole of siloxy unit). At this point there were two liquid phases. The apparatus was purged with argon, and the contents of the flask subsequently protected with argon. The flask was placed into an oil bath at 150° C., and potassium silanolate added dropwise so that the final concentration of the catalyst, as K, was 35 p.p.m. The contents of the flask were stirred for six hours at 150° C. After this period, the product was a homogeneous, colorless oil. The oil was cooled to about 100° C. and enough glacial acetic acid added to neutralize the catalyst. The oil was transferred to a 500-ml. boiling flask equipped with distillation head and receiver. Volatile material was removed by sparging with argon at 150° C. at 1–5 mm. Hg for 1½ hrs. A clear colorless oil (130 g.) was obtained. The viscosity at 77° F. was 153 centistokes. The oil was identified by infrared analysis and by analysis for nitrogen content.

EXAMPLE II

*A trimethylsiloxy end-blocked delta-aminobutylmethylsiloxane-modified dimethylpolysiloxane oil having a molecular weight of about 5000 and containing an average of about 2 delta-aminobutylmethylsiloxane units per molecule (containing about 25% by weight of delta-aminobutylmethylsiloxane units)*

To a 500-ml. flask equipped with air condenser and mechanical stirrer was added the cyclic tetramer of dimethylsiloxane (134.6 g., 1.82 mole of siloxy unit), dodecamethylpentasiloxane (15.4 g., 0.40 mole) and a mixture of cyclic delta-aminobutylmethylsiloxanes (50.0 g., 0.38 mole of siloxy unit). At this point there were two liquid phases. The apparatus was purged with argon, and the contents of the flask subsequently protected with argon. The flask was placed into an oil bath at 150° C. and potassium silanolate added dropwise so that the final concentration of the catalyst, as K, was 35 p.p.m. The contents of the flask were stirred for about 13 hr. at 150° C. After this period the product was a homogeneous, colorless oil. The oil was cooled to about 100° C. and enough glacial acetic acid added to neutralize the catalyst. The oil was transferred to a 500-ml. boiling flask equipped with distillation head and receiver. Volatile material was removed by sparging with argon at 150° C. at 1–5 mm. Hg for two hours. A clear colorless oil (184 g.) was obtained. The viscosity at 77° F. was 107 centistokes. The oil was identified by infrared analysis and by analysis for nitrogen content.

EXAMPLE III

*A delta-aminobutyldimethylsiloxy end-blocked dimethylpolysiloxane oil*

To a glass tube was added cyclic tetramer of dimethylsiloxane (5.92 g., 0.08 mole), 1,2-di-delta-aminobutyl- 1,1,2,2-tetramethyldisiloxane (2.70 g., 0.01 mole) and potassium silanolate (0.043 g., 0.5%). The mixture was heated at 150° C. for 20 hours and then cooled. The product was a colorless oil. The viscosity at 25° C. was 36 centistokes. The oil was identified by molecular weight analysis.

EXAMPLE IV

*A gamma-aminopropylmethylethoxy end-blocked oil with dimethylsiloxane units and diphenylsiloxane units*

In a 500-ml. flask were placed gamma-aminopropylmethyldiethoxysilane (60.0 g., 0.3 mole), the cyclic tetramer of diphenylsiloxane (61.49, 0.31 mole), the cyclic tetramer of dimethylsiloxane (23.0 g., 0.31 mole). This mixture was heated to 150° C. The reactants were not compatible. Potassium silanolate catalyst (0.9 g., 200 p.p.m. as K) was added at this temperature, and the mixture swirled occasionally. After about three hours, the mixture became homogeneous. Heating at 150° C. was continued for five more hours. On cooling a crystalline precipitate appeared. More catalyst (0.9 g.) was added, and the mixture heated at 150° C. for 7 hours. The product (111 g.) was cooled, the resultant amber-colored oil filtered, and the filtrate stripped (15 min. at 70-80° C., 1.0 mm.). The oil was identified by analysis for nitrogen and ethoxy content.

EXAMPLE V

*A delta - aminobutylmethylsiloxane - diphenylsiloxane-modified dimethylpolysiloxane oil end-blocked with trimethylsiloxane units*

In a 3-necked, round-bottom 500 ml. flask were placed dodecamethylpentasiloxane (19.2 g., 0.05 mole), diphenylsiloxane cyclic tetramer (50 g., 0.25 mole), dimethylsiloxane cyclic tetramer (24.2 g., 0.33 mole) and delta-aminobutylmethylsiloxane cyclic tetramer (6.6 g., 0.05 mole). The mixture was heated in a 160° C. oil bath. The reactants were not compatible. Potassium silanolate catalyst (30 p.p.m.) was added at this temperature, and the mixture stirred continuously. After 0.5 hr., the mixture cleared. Heating and stirring were continued for a total of 4–5 hours. There was obtained a colorless oil.

EXAMPLE VI

*The use of delta-aminobutylmethyl-modified dimethylpolysiloxane oil in water repellent treatment of fabrics*

A delta-aminobutylmethyl-modified dimethylpolysiloxane oil (4 g.) was mixed with a dimethylsiloxane-dihydrogensiloxane polymer (4 g.). This mixture was diluted with (392 g.) of a solvent and a catalyst, suitable for curing the oil, was added. Samples of wool, cotton, and 50:50 viscose-acetate were immersed in this treating solution, shaken for 30 seconds, removed and wrung in a Padder roll. They were stretched on drying racks and cured. Water repellency developed on curing the wool cloth for 20 minutes at 100° C. and the cotton and viscose-acetate cloths, 10 minutes at 100° C.

EXAMPLE VII

*Preparation of a 10% delta-aminobutylmethyl-modified dimethylpolysiloxane oil (M.W. 5000), by reaction of a delta-aminobutylmethylpolysiloxane hydrolyzate with dimethylsiloxane cyclic tetramer and dodecamethylpentasiloxane*

To a 250 cc. flask equipped with mechanical stirrer and reflux condenser was added delta-aminobutylmethylsiloxane hydrolyzate (15 g.), dimethylsiloxane cyclic tetramer (123.5 g.) and dodecamethylpentasiloxane (11.5 g.). (The hydrolyzate had been prepared by addition of water to delta-aminobutylmethyldiethoxysilane and subsequently stripping off ethanol and excess water, one mole excess). The unhomogeneous mixture was stirred and heated in an oil bath to 150° C. Then potassium silanolate (50 p.p.m. K) was added and the mixture stirred. Within 5 minutes the mixture became homogeneous. Heating was continued for 17 hours, then cooled somewhat, and three drops of glacial acetic acid added. Lights were stripped off in an argon stream at reduced pressure (maximum pot temperature 150° C.). The product was a colorless oil having a viscosity at 25° C. of 200 cps. and was identified by analysis for nitrogen content.

EXAMPLE VIII

Trimethylsiloxy end-blocked organopolysiloxane oils were also prepared by heating mixtures of the cyclic tetramer of dimethylsiloxane dodecamethylpentasiloxane with each of the following mixtures in the presence of a catalyst (1) gamma-aminopropyldimethylsiloxane and the cyclic tetramer of diphenylsiloxane, (2) the cyclic tetramer of delta-aminobutylmethylsiloxane and a linear trimethylsiloxy end-blocked methylphenylpolysiloxane oil, and (3) the cyclic tetramer of delta-aminobutylmethylsiloxane and the cyclic tetramer of diphenylsiloxane.

A gamma-aminopropylidimethylsiloxy end-blocked dimethylpolysiloxane oil was prepared by heating 0.01 mole of the dimer of gamma-aminopropyldimethylsiloxane and 0.08 mole of the cyclic tetramer of dimethylsiloxane to a temperature of about 150° C. in the presence of a potassium silanolate catalyst. A delta-aminobutyldimethylsiloxy end-blocked dimethylpolysiloxane oil was prepared by heating 0.01 mole of the dimer of delta-aminobutyldimethylsiloxane with 0.8 mole of the cyclic tetramer of dimethylsiloxane.

EXAMPLE IX

Following the procedure disclosed in Example I, various trimethylsiloxy end-blocked gamma-aminopropylmethylsiloxane- and delta-aminobutylmethylsiloxane-modified dimethylpolysiloxane oils were prepared and their electrical properties determined. The data obtained appears in the table below.

TABLE

| Type of oil: $(Me_3SiO)_4$ $+MD_3M+$* | Mol. Wt. (Calc.) | Visc.-Temp. Coeff. | Diel Const. (1,000 cycl.) | Power Factor | Resistivity (ohm-cm.) |
|---|---|---|---|---|---|
| Cyclic delta-aminobutylmethylsiloxanes in an amount by weight: | | | | | |
| 5 | 5,000 | 0.60 | 2.81 | 0.0001 | $9.0 \times 10^{13}$ |
| 10 | 5,000 | 0.62 | 2.90 | 0.0001 | $4.8 \times 10^{13}$ |
| 10 | 10,000 | 0.63 | 2.94 | 0.0002 | $4.8 \times 10^{13}$ |
| 10 | 20,000 | 0.63 | 2.96 | 0.0001 | $2.0 \times 10^{13}$ |
| 25 | 5,000 | 0.65 | 3.21 | 0.0001 | $1.3 \times 10^{13}$ |
| Cyclic gamma-aminopropylmethylsiloxanes in an amount by weight: | | | | | |
| 10 | 1,000 | 0.60 | 2.87 | 0.0001 | $2.2 \times 10^{13}$ |
| 10 | 5,000 | 0.63 | 2.95 | 0.0001 | $4.2 \times 10^{13}$ |
| 10 | 10,000 | 0.63 | 2.95 | 0.0001 | $2.4 \times 10^{14}$ |
| 10 | 20,000 | 0.64 | 2.96 | 0.0001 | $2.4 \times 10^{14}$ |
| 10 | 30,000 | 0.66 | 2.95 | 0.0001 | $6.0 \times 10^{14}$ |
| 25 | 5,000 | 0.67 | 3.30 | 0.0001 | $1.4 \times 10^{13}$ |

*Dodecamethylpentasiloxane.

What is claimed is:

1. End-blocked polysiloxanes composed of 1 to 30 siloxane units having the formula:

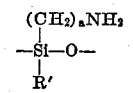

5 to 400 siloxane units having the formula:

$$-\underset{\underset{R'}{|}}{\overset{\overset{R'}{|}}{Si}}-O-$$

wherein "a" is an integer of at least 3 and R' is a group selected from the class consisting of methyl and phenyl, and 1 to 2 terminal siloxane units of the formula:

$$\equiv Si-O-$$

wherein one of the unfilled valences of silicon is satisfied by a member selected from the class consisting of the $H_2N(CH_2)_a$-grouping, wherein $a$ is a number having a value of at least 3, and alkoxy groups and wherein the remaining unfilled valences of said silicon are satisfied by a member selected from the class consisting of methyl and alkoxy groups, said siloxane units of the formula:

$$-\underset{\underset{R'}{|}}{\overset{\overset{(CH_2)_aNH_2}{|}}{Si}}-O-$$

can be present in said end-blocked polysiloxanes as a part of said terminal siloxane units.

2. A delta-amino-butylmethylethoxysiloxy end-blocked polysiloxane oil containing from 5 to 400 diphenylsiloxane units and dimethylsiloxane units.

3. A delta-aminobutyldimethylsiloxy end-blocked siloxane oil containing from 1 to 30 delta-aminobutylmethylsiloxane units and from 5 to 400 dimethylsiloxane units.

4. A gamma - aminopropylmethylethoxysiloxy end-blocked siloxane oil containing from 1 to 30 gamma-aminopropylmethylsiloxane units and from 5 to 400 dimethylsiloxane units and diphenylsiloxane units.

5. A gamma-aminopropyldimethylsiloxy end-blocked siloxane oil containing from 5 to 400 dimethylsiloxane units and diphenylsiloxane units.

6. A gamma-aminopropyldimethylsiloxy end-blocked siloxane oil containing from 5 to 400 dimethylsiloxane units.

7. A process for preparing end-blocked organopolysiloxanes containing at least one siloxane unit selected from the class consisting of $$\left[-\underset{\underset{R'}{|}}{\overset{\overset{(CH_2)_aNH_2}{|}}{Si}}-O-\right]$$

and $$\left[R-\underset{\underset{R}{|}}{\overset{\overset{(CH_2)_aNH_2}{|}}{Si}}-O-\right]$$

wherein "a" is an integer of at least 3, R' is a group selected from the class consisting of methyl and phenyl and R is a group selected from the class consisting of methyl and alkoxy which comprises forming a mixture of (I) an aminoalkyl silicon compound in which the amino group is linked to the silicon atom thereof through a polymethylene chain of at least 3 carbon atoms taken from the group consisting of (a) cyclic aminoalkylalkylsiloxanes and (b) alkoxy end-blocked aminoalkylmethylpolysiloxanes, alkoxy end-blocked aminoalkylphenylpolysiloxanes, aminoalkylmethyldialkoxysilanes, aminoalkyldimethylalkoxysilanes, and bis(aminoalkyldimethyl)disiloxanes with (II) an organosilicon compound taken from the class consisting of (c) cyclic dimethylsiloxanes, cyclic diphenylsiloxanes, cyclic methylphenylsiloxanes and (d) trimethylsiloxy end-blocked dimethylpolysiloxanes, alkoxy-containing dimethylpolysiloxanes, alkoxy-containing diphenylpolysiloxanes, said mixture when comprising an aminoalkylsilicon compound of I(a) and an organosilicon compound of II(c) containing in addition thereto a compound selected from the class consisting of aminoalkylsilicon compounds of I(b) and organosilicon compounds of II(d), and (III) an alkali metal equilibration catalyst, and heating said mixture to a temperature sufficiently elevated to cause said compounds present in said mixture to react to form said end-blocked organopolysiloxane.

8. A process for preparing a trimethylsiloxy end-blocked delta-aminobutylmethylsiloxane-modified dimethylpolysiloxane oil which comprises forming a mixture of a cyclic dimethylsiloxane, a cyclic delta-aminobutylmethylsiloxane, a relatively low molecular weight trimethylsiloxy end-blocked dimethylpolysiloxane, and an alkali catalyst and heating the mixture to a temperature sufficiently elevated to cause said siloxanes to react to form a trimethylsiloxy end-blocked delta-aminobutylmethylsiloxane-modified dimethylpolysiloxane oil.

9. A process for preparing a trimethylsiloxy end-blocked gamma-aminopropylmethylsiloxane-modified dimethylpolysiloxane oil which comprises forming a mixture of a cyclic dimethylsiloxane, a cyclic gamma-aminopropylmethylsiloxane, a relatively low molecular weight trimethylsiloxy end-blocked dimethylpolysiloxane, and an alkali catalyst and heating the mixture to a temperature sufficiently elevated to cause said siloxanes to react to form a trimethylsiloxy end-blocked gamma-aminopropylmethylsiloxane-modified dimethylpolysiloxane oil.

References Cited in the file of this patent
UNITED STATES PATENTS

| | | |
|---|---|---|
| 2,469,888 | Patnode | May 10, 1949 |
| 2,489,138 | Hyde et al. | Nov. 22, 1949 |
| 2,557,803 | Sommer | June 19, 1951 |
| 2,754,311 | Elliott | July 10, 1956 |
| 2,762,823 | Speier | Sept. 11, 1956 |
| 2,819,245 | Shorr | Jan. 7, 1958 |
| 2,838,515 | Sommer | June 10, 1958 |